Figures 1, 2:
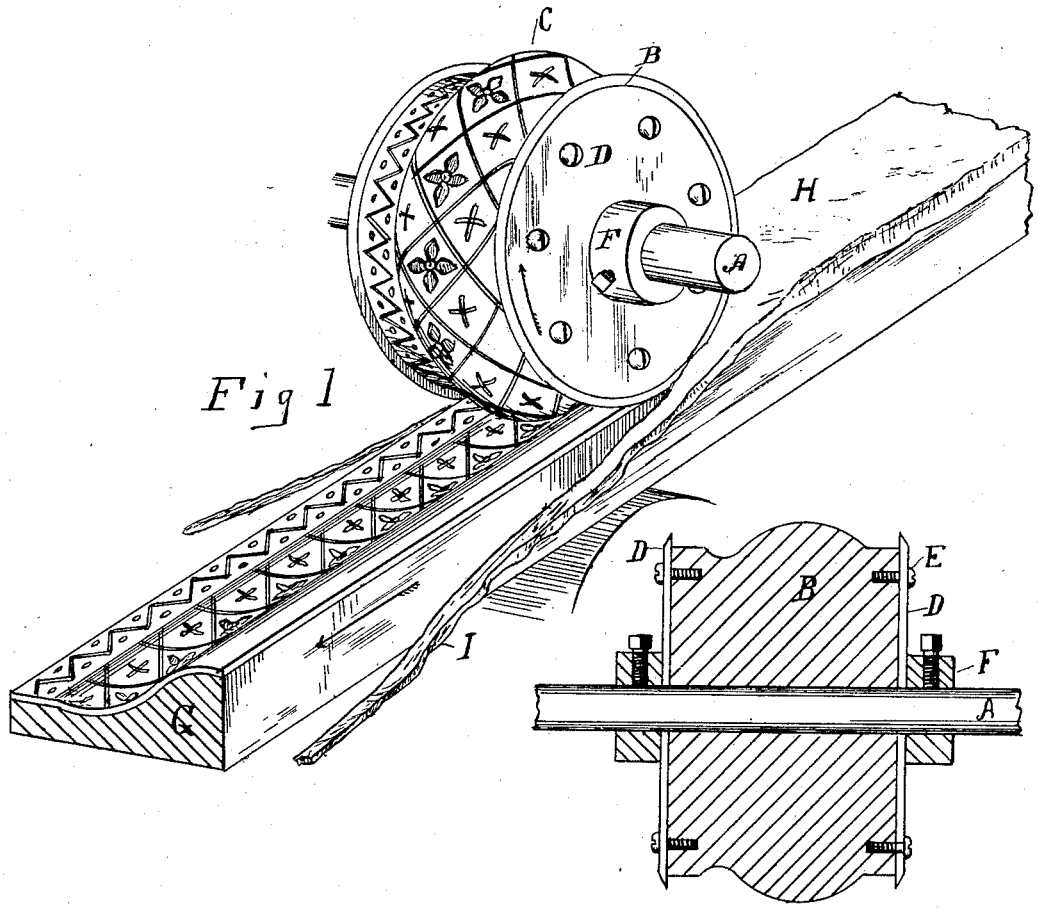

(No Model.)

P. REUHL.
ORNAMENTAL ROLLER DIE FOR MOLDING.

No. 328,339. Patented Oct. 13, 1885.

Witnesses:
Robert Kirk.
O. J. Bailey

Inventor:
Peter Reuhl
By J. S. Zerbe
Attorney.

UNITED STATES PATENT OFFICE.

PETER REUHL, OF CINCINNATI, OHIO.

ORNAMENTAL ROLLER-DIE FOR MOLDINGS.

SPECIFICATION forming part of Letters Patent No. 328,339, dated October 13, 1885.

Application filed February 24, 1885. Serial No. 156,687. (No model.)

*To all whom it may concern:*

Be it known that I, PETER REUHL, of Cincinnati, in the county of Hamilton and State of Ohio, have invented a new and useful Improvement in Ornamental Roller-Dies for Moldings, which improvement is fully set forth in the following specification and accompanying drawings, in which—

Figure 1 is a perspective elevation of my improved ornamental roller-die for moldings, and Fig. 2 is a cross-vertical section of the roller and cutters.

The object of my invention is to construct an ornamental roller-die having detachable cutters connected therewith, whereby the putty or other plastic material which is placed upon the molding and impressed thereon by the ornamental roller will have the surplus edges trimmed off clean and neat at the same time that the roller forms the impression of the plastic material on the molding or strip, and said cutters prevent a tendency to lateral displacement of the roller-die.

Heretofore it has been customary to first make the ornamental impression on the molding and then afterward trim off the surplus edge of the plastic material either by means of a sharp instrument or by disk cutters or cutters which followed immediately after the roller-die which formed the impression; but the difficulty experienced was to keep the surface of the ornamental impression intact during the operation of trimming off, owing to the fact that the knife or disk cutter in traversing the edge would invariably disarrange the ornamental surfaces and destroy the edges. The object, therefore, is to construct a roller-die capable of not only forming the ornamental surface, but of trimming the edges by means of the same mandrel, or by a cutter or cutters rotating on or with the same shaft upon which the ornamental die rotates.

For the purpose of carrying out my invention I provide the shaft or mandrel A with a roller-die, B, having thereon the ornamental figures C, the surface being made to conform to the shape of the molding upon which the plastic material is to be pressed. The roller may be cast with the shaft A, or it may revolve thereon loosely; but this is no part of the present invention, and is therefore immaterial. On each end or side of this roller is a disk cutter, D, somewhat larger in diameter than the respective edge of the roller against which it rests. These cutters may be secured to the roller either by screws E or by collars F on the shaft A.

In operation it will be observed that the molding G is of the exact shape in cross-section to fit the roller B, so that when the plastic material H is placed on the molding and the roller moved along the molding the disk cutters D will trim off by a shear cut the surplus edges I of the plastic material at the same time that the pressure of the roller produces the even and ornamental surface upon the molding.

What I claim as new is—

The die B, rotating on shaft A and having on each side or end a cutter-disk, D, combined with a molding, G, whereby the plastic material can be trimmed off by a shear cut, substantially as described.

In testimony that I claim the foregoing I have hereunto set my hand, this 19th day of February, 1885, in the presence of witnesses.

PETER REUHL.

Witnesses:
THEO. W. MEADER,
J. WM. JOHNSON.